United States Patent [19]

Moore

[11] 3,878,304
[45] Apr. 15, 1975

[54] METHOD OF PRODUCING A PELLETED SLOW-RELEASE NPN FEED FOR RUMINANTS FROM WASTE POLYSACCHARIDE MATERIALS

[75] Inventor: William Percy Moore, Hopewell, Va.

[73] Assignee: Allied Chemical Corporation, New York, N.Y.

[22] Filed: Oct. 21, 1974

[21] Appl. No.: 516,696

Related U.S. Application Data

[63] Continuation-in-part of Ser. No. 499,748, Aug. 22, 1974, abandoned, which is a continuation of Ser. No. 386,245, Aug. 6, 1973, abandoned, which is a continuation of Ser. No. 228,313, Feb. 22, 1972, abandoned.

[52] U.S. Cl. .......... 426/69; 426/210; 426/373; 426/374; 426/807; 71/25; 71/29
[51] Int. Cl. .......... A23k 1/14; A23k 1/22
[58] Field of Search .......... 426/2, 69, 74, 807, 210, 426/213, 364, 373, 374, 377, 456; 71/11, 25, 26, 28, 29

[56] References Cited
UNITED STATES PATENTS

| 2,861,886 | 11/1958 | Colby | 99/2 |
|---|---|---|---|
| 3,050,383 | 8/1962 | Wilson | 71/11 |
| 3,073,693 | 1/1963 | Nielsson et al. | 71/29 |
| 3,490,912 | 1/1970 | Freese | 99/2 ND |
| 3,512,986 | 5/1970 | Snyder | 426/2 |
| 3,655,395 | 4/1972 | Karnemaat | 71/28 |
| 3,677,767 | 7/1972 | McNeff | 99/6 |
| 3,733,203 | 5/1973 | Steen | 71/26 |

FOREIGN PATENTS OR APPLICATIONS

| 1,002,198 | 8/1965 | United Kingdom | 426/69 |
|---|---|---|---|
| 1,104,934 | 3/1968 | United Kingdom | 99/2 ND |

Primary Examiner—Norman Yudkoff
Assistant Examiner—Curtis P. Ribando
Attorney, Agent, or Firm—Fred L. Kelly

[57] ABSTRACT

Waste or by-product carbohydrate materials comprising polysaccharides are converted into slow-release nitrogen products valuable as a protein substitute in ruminant feeding and as a slow-release fertilizer for growing plants. The slow-release properties are achieved by acid catalyzed reaction of an amide such as urea or biuret with partially degraded waste or by-product polysaccharides and by agglomeration of this combination into particles having substantial physical integrity. The waste or by-product polysaccharide materials include citrus pulps, bagasse, peanut hulls, wheat straw and waste paper.

8 Claims, No Drawings

METHOD OF PRODUCING A PELLETED SLOW-RELEASE NPN FEED FOR RUMINANTS FROM WASTE POLYSACCHARIDE MATERIALS

CROSS REFERENCES TO RELATED APPLICATIONS

This application is a continuation-in-part of my copending application Ser. No. 499,748, filed Aug. 22, 1974 and now abandoned, which is a continuation of application Ser. No. 386,245, filed Aug. 6, 1973, now abandoned, which is a continuation of application Ser. No. 228,313, filed Feb. 22, 1972, now abandoned. This application is related to application Ser. No. 163,305, filed July 16, 1971.

BACKGROUND OF THE INVENTION

Farm animals are commonly grouped into two classifications: ruminant and monogastric. Ruminant animals, which include cattle and sheep, have a complex stomach of several compartments. The first stomach, lying next to the reticulum, is known as the rumen.

It is well known that ruminant animals have the unique ability of utilizing nonprotein nitrogeneous compounds such as urea, biuret, formamide and acetamide, as well as phosphorus and sulfur compounds such as ammonium phosphates and ammonium sulfate. This is accomplished by the symbiotic relationship between microorganisms that multiply in the rumen and reticulum of the ruminant animals, which actually utilize the compounds and convert them into organismal material that can in turn be digested and absorbed by the ruminant.

As a nonproteinaceous source of nitrogen, urea is particularly attractive in feeding ruminants because it represents a concentrated and economical form of nitrogen. Pure urea contains about 46.5% nitrogen, but the amount that can safely be incorporated in ruminant feeds is limited by the fact that it possesses a definite toxicity limit toward ruminants. Accordingly, the art has long sought a practical and economical way of utilizing urea in animal feeds while at the same time minimizing its toxic propensities. U.S. Pat. No. 3,490,912 discloses admixing a solution of urea with a solid absorbent feedstuff, drying the mixture, and pelleting the dried urea-containing feedstuff. Unfortunately, the resulting pellets have relatively poor crushing strength. Thus, there is a present need for improvement in such formulations. Also, as presently utilized in animal feeds, urea must be supplied in limited amounts, for if too much is included in the feed, or if it is not well blended with the other ingredients, digestive or other disturbances may result which may even be severe enough to cause death.

SUMMARY OF THE INVENTION

The chief object of this invention is to provide a new controlled release nitrogen particulate product suitable for safe use in either animal feeds or plant foods, containing primarily adducts of natural polysaccharides and amides plus minor amounts of amidecarbonyl polymers to form physically strong particles.

Another object of this invention is to provide a process for producing a novel composition which delivers synthetic nitrogen for safe and efficient use in agricultural environments without addition of undesirable materials to the environment. This composition is equally effective for delivery of synthetic nitrogen for plant foods or for safe delivery of synthetic nitrogen as a protein substitute in ruminant feeds.

Still another object of the invention is to provide a process for converting waste or by-product materials comprising polysaccharides into a valuable slow-release nitrogen composition useful in agriculture, thereby improving the ecology with respect to waste disposal.

In accordance with the invention, I provide a process for preparing a pelleted slow-release nitrogen composition suitable for use as a protein substitute in ruminant feeding and as a fertilizer for growing plants, said process comprising the following steps:

a. impregnating a solid waste or by-product carbohydrate material consisting essentially of polysaccharides with an aqueous solution of an amide selected from the group consisting of urea, biuret, formamide, and acetamide, and an acid catalyst selected from the group consisting of sulfuric acid, phoshoric acid and acidic ammonium salts of sulfuric acid and phosphoric acid, thereby providing an acid catalyst for hydrolysis of the polysaccharides to form carbonyl groups reactive to urea;

b. drying and reacting said impregnated solid material at a temperature within the range 160° to 290°F. to obtain a dried impregnated solid material containing urea-polysaccharide adducts and at least about 5% water;

c. pelleting and agglomerating said dried impregnated solid material while maintaining the temperature thereof at least about 140°F; and d. cooling the resulting pelleted product to ambient temperature.

The pelleted product thus obtained normally has a total nitrogen content of about 2–10 of about 50 to 90 percent of the total nitrogen. The nitrogen may be determined to be either soluble or insoluble by AOAC tests (*AOAC Official Methods of Analysis*, Eleventh Edition, 1970, page 18).

In terms of ruminant nutrients, the pelleted product preferably contains about 25–60 percent protein equivalent. The protein equivalent of the product may be controlled by adjusting the proportion of the amide solution admixed with the solid waste or by-product polysaccharide material.

Suitable acid catalysts for use in the process include sulfuric acid, ammonium acid sulfate, ammonium sulfate, orthophosphoric acid, pyrophosphoric acid, superphosphoric acid and acid ammonium salts of said phosphoric acids. Preferred catalysts are superphosphoric acid and ammoniated superphosphoric acid because these materials furnish valuable nutrient phosphate, are readily available commercially, and normally contain soluble trace minerals needed for plant and animal nutrition.

Aqueous ammoniated superphosphoric acid for use in the process of the invention can be produced by evaporating aqueous wet-process phosphoric acid to form superphosphoric acid, which is then ammoniated. Canadian Pat. No. 812,689, granted to Allied Chemical Corporation, relates to the concentration of wet-process phosphoric acid to produce superphosphoric acid, i.e., phosphoric acid containing polyphosphates.

The preferred aqueous ammoniated superphosphoric acid of this invention has a pH of from about 5 to 6, desirably about 6; a nitrogen content of from about 9 to 12% by weight, preferably from about 10 to 11% by weight; a total phosphorus content measured as $P_2O_5$ of from about 28 to 39% by weight, preferably about 34 to 38% by weight, and wherein polymeric phosphates represent from about 30 to 70% by weight, preferably from about 55 to 65% by weight, based on the weight of the total phosphorus content. The polymeric phosphates include pyrophosphates and polyphosphates.

An aqueous ammoniated superphosphoric acid having the following properties which will hereinafter be referred to as "Solution A," was found to be particularly useful for purposes of the present invention:

| | |
|---|---|
| Nitrogen | 10.1% by weight |
| Phosphorus (as $P_2O_5$) | 34.2% by weight |
| Trace Minerals | 1 to 2% by weight |
| iron ($Fe_2O_3$) | ca. 1.0% by weight |
| calcium (CaO) | ca. 0.1% by weight |
| magnesium (MgO) | ca. 0.3% by weight |
| pH | 6.0 |
| Specific Gravity at 60°F. | 1.4 |
| Salting Out Temperature | ca. 0°F. |

Distribution as percent by weight of the ammonium phosphates of Solution A was about:
  35% ammonium orthophosphate
  51% ammonium pyrophosphate
  8% ammonium tripolyphosphate
  5% ammonium tetrapolyphosphate
  1% higher ammonium phosphates I have found that when the acid-catalyzed, amide-impregnated polysaccharides are dried and pelleted in accordance with the present invention, the product pellets that result have a hard, refractory appearance. It was also found that the instant process, including the catalyst addition, surprisingly improves the strength and storage properties of the product. Thus, the product can be handled with all normal material handling techniques such as belt conveying, screw conveying, trucking, and shoveling without the problems of particle degradation and formation of dust in the work area. Further, the supplemented product has the nutrients so tightly bound that "bin set" from the migration of salts to the particle surface is completely eliminated.

I have also found that the product of the invention is an improved ruminant feed composition which releases nitrogen in a slow and controlled manner in the rumen of the animal. In effect, the process of the invention combines low cost amides and waste or by-product materials containing polysaccharides into a variable source of slow-release nitrogen which can be fed to ruminants with a high degree of safety. Moreover, the new product of the invention permits the use of more low-cost synthetic protein equivalent than previously has been considered practical.

While not wishing to be bound by any theory, applicant believes that the slow-release properties of the present product are achieved by chemical reaction of the amide with partially degraded, hydrolyzed polysaccharides formed under conditions of the process and by agglomeration of this combination into particles having substantial physical integrity by a polymer formed by reaction of the urea with reactive lower polysaccharides which constitute a concentrated carbonyl source. Applicant further believes that said reactions of urea with polysaccharides are catalyzed by acids and salts of strong acids and weak bases, e.g., superphosphoric acid, ammoniated superphosphoric acid, ammonium sulfate, etc.

Although the pellets are hardened by treatment with the amide liquor and the dusting tendency is decreased, the pellets still retain enough porosity to allow absorption of the extra medicinal and vitamin materials which are usually used to protect animals from diseases. The hardness of the pellets surprisingly does not prevent the degradation of the pellets in the rumen so that the large surface area of the original roughage is regenerated in the rumen and benefit from the roughage content of the feed is obtained by the ruminant.

Moreover, the amide-impregnated polysaccharides on drying and reacting in accordance with the present invention, appear to provide lubrication that significantly increases pellet production rates. This improvement is particularly unexpected. While the mechanism by which the pelleting rate is increased is not known with certainty, it is suggested that the partially dried impregnated material is somewhat thermoplastic at the advanced temperatures normally used for pelleting.

DESCRIPTION OF THE PREFERRED EMBODIMENT

The preferred composition of the invention delivers 25 to 60 percent protein equivalent for safe and efficient use as a ruminant feedstuff or as a slow-release nitrogen fertilizer. The preferred composition comprises acid catalyzed adducts of synthetic amide nitrogen compounds, preferably urea and biuret, with insoluble waste or by-product polysaccharides bound into durable particles by relatively small amounts of amide adducts of water-soluble polysaccharides containing carbonyl groups.

The amide-carbonyl adducts for forming durable particles are best made by partially degrading or hydrolyzing polysaccharides in the presence of an acid catalyst to form lower sugars which have carbonyl groups active enough for reaction with urea to form stable adducts. The preferred acid catalyst, both for hydrolysis of the polysaccharides and for the amide-carbonyl reaction, is superphosphoric acid or acidic ammonium salts thereof.

Some additional polysaccharide materials which are preferably highly concentrated and react readily with amides to form polymers, can be added to this composition to enhance fertilizer and feed uses. The superphosphoric acid catalyzing the adduct formation is also useful as a primary nutrient in both animal and plant foods. Other materials which may be added during the formation of the durable particles include: potassium compounds, sulfate compounds, trace minerals, vitamins, or other natural materials such as proteins or fats. These particles provide an especially effective method for using waste materials such as slaughterhouse wastes, sludges recovered from sewage treatment plants, as well as low cost by-products such as molasses.

Preferred waste or by-product carbohydrate materials for use in the process of the invention consist essentially of water-insoluble polysaccharides containing minor amounts of water-soluble polysaccharides, e.g., about 0.5–7 percent based on the total weight of the polysaccharides. The preferred polysaccharide materials are primarily by-products such as orange pulp from orange juice production plants, bagasse, peanut hulls, wheat straw, and waste paper. All of these by-products contain less than 1% by weight of nitrogen and therefore are too low in protein to be suitable as a complete ruminant feedstuff, per se.

The preferred process can be carried out using either superphosphoric acid or ammoniated superphosphoric acid; however, for convenience, the preferred practice of the invention will be discussed in terms of incorporation of a liquid supplement comprising primarily ammoniated superphosphoric acid, urea, ammonium sulfate and water, into a relatively non-absorbent polysaccharide such as fresh orange pulp from an orange juice production plant. The resulting mixture is reacted and dehydrated in a rotary dryer with temperatures and retention times closely controlled to remove most of the water, but not enough to char the polysaccharides. Water content of the dried material is preferably about 6–12 weight percent. Preferably, a minor proportion of water-soluble polysaccharides such as molasses is included in the formulation as a concentrated carbonyl source for binding. The partially dried materials are then made into pellets.

Optimum conditions for successful production of a pelleted product with high and constant nutritional value are as follows:

| Condition | Preferred |
| --- | --- |
| Supplement Composition | |
| Ammoniated Superphosphoric Acid (dry basis) | 10–25% (wt.) |
| Ammonium Sulfate | 4–8% (wt.) |
| Molasses (or other water-soluble polysaccharides) | 0–20% (wt.) |
| urea | 20–35% (wt.) |
| Waste or By-Product Polysaccharide Base (containing water-soluble and water-insoluble polysaccharides) | citrus pulp |
| Ratio Natural Base to Supplement (dry basis) | 6–10 lbs./lb. |
| Drying Temperature (actual temp. of solids) | 180–240°F. |
| Retention Time in Dryer | 5–60 min. |
| Water Content of Finished Product | 6–12% (wt.) |
| Pellet Formation Temperature | 140–300°F. |
| Retention Time Before Pellet is Cooled | 1–60 min. |

It is generally accepted that non-protein nitrogen such as urea is best used in conjunction with protein nitrogen for good results in ruminant feeding. However, in accordance with the present invention, the proportion of urea to natural protein can be increased if desired because a significant proportion of the urea is converted to slow-release nitrogen which is non-toxic to the ruminant.

In accordance with one preferred embodiment of this invention, an aqueous supplement containing 10 to 25 percent by weight of ammoniated superphosphoric acid (dry basis), 4 to 8 percent by weight of ammonium sulfate, 0 to 20 percent by weight of molasses or other water-soluble polysaccharides and 20 to 35 percent by weight of urea is sprayed onto orange pulp and the mass is mixed in suitable equipment such as a chip blender. The mixing is carried out at a sufficiently high temperature to maintain the urea in aqueous solution during the spraying and mixing operation; a temperature in the range 50°–100°F. is normally used depending on the concentration of the supplement solution. Spraying is continued until the mass contains up to 60 percent by weight protein equivalent, on a dry weight basis. The damp mass is dried at a temperature of 180°–240°F. A gas fired dryer is suitable equipment for the drying operation. Product temperature in the dryer should not exceed about 290°F. and is normally maintained in the range 180°–240°F. Excessive drying temperatures may char the polysaccharides. The impregnated orange pulp is dried within 5 to 60 minutes sufficiently to remove most of the water, i.e., it is reduced to a dry, free-flowing material containing water at a level not less than about 6 percent and not more than about 12 percent water. During the drying, a significant proportion of the urea is reacted with partially hydrolyzed polysaccharides to form polysaccharideurea adducts.

The thus prepared and dried impregnated orange pulp may be blended with water-soluble polysaccharides but the water-soluble polysaccharides may be added prior to drying. The dried impregnated orange pulp is preferably pelleted at a temperature within the range of about 140°–300°F., whereby the residual urea becomes more soluble in the water which is retained by the dried impregnated absorbent. Thus, the liquid phase of the material to be pelleted increases, thereby permitting increased pelleting rate. Further reaction of the urea with hydrolyzed polysaccharides occurs during the pelleting operation at temperatures of say 140°–300°F. and pressures of 500–20,000 psig. While maintaining its temperature at 140°–300°F., the mixture is extruded through a die and broken into pellets. The amount of supplement in the overall formulation varies with the need for protein supplementation. Normally, sufficient supplement is added to provide a protein equivalent of 25–60 percent in the pelleted product. The pelleted mixture is preferably cooled to ambient temperature within about 1 to 60 minutes after pelleting. Reaction of residual urea with polysaccharides continues after pelleting until the product is cooled. Pelleting may be effected by any of the conventional methods employing known hard pelleting equipment and pellets of various sizes, as desired, may be formed. In general, pellets ranging in size from 1/16 inch diameter to 1 inch diameter are employed.

The following examples are given for the purpose of further illustrating this invention. In these examples percentages are by weight. Solution A used in these examples is aqueous ammoniated superphosphoric acid having the composition described hereinabove.

EXAMPLE 1

The by-product carbohydrate material used in this example was pulp from oranges after removal of juice and drying. The composition of the orange pulp was:

| Component | Weight Percent |
| --- | --- |
| Polysaccharides | 48.1 |
| Moisture | 10.1 |
| Ash | 5.1 |
| Nitrogen | 0.4 |

These polysaccharides are of two general types: those that form the skeletal structure of the orange, i.e., fibers, which are water insoluble, and water-soluble polysaccharides including simple sugars. The polysaccharides present were primarily of the insoluble type.

About 400 parts of the dried orange pulp was blended with 10 parts of Solution A and 100 parts of aqueous urea containing 40 parts of urea. The resulting mixture was reacted and dried in a rotating reactor for 25 minutes at atmospheric pressure, with temperature of the reaction mass maintained at about 205°F. by external heating of the reactor. Samples of the reaction mixture were tested with Fehling solution and showed the presence of aldehydic carbonyl groups.

The resulting partially reacted material was then blended with 50 parts of sewage sludge, which sludge had been heated to 220°F. for 20 minutes to assure that no active bacteria or molds were present. The composition of the sewage sludge was:

| Component | Weight Percent |
| --- | --- |
| Polysaccharides | 51.0 |
| Ash | 18.1 |
| Nitrogen | 4.1 |
| Phosphate (as $P_2O_5$) | 2.5 |
| Moisture | 2.8 |

The sludge reduced Fehling's solution indicating presence of aldehydic carbonyl groups.

The resulting blended mixture was then formed into pellets about ⅜ inch in length by ⅜ inch in diameter, and the pellets were heated in an autoclave at 240°F. for 1 hour. Pressure in the autoclave was maintained at 1,000 psig by means of nitrogen pressure. After 1 hour, the pressure was released and the pellets were cooled to ambient temperature. The composition of the resulting product was:

| Component | Weight Percent |
| --- | --- |
| Protein Equivalent | 30.1 |
| Moisture | 5.1 |
| Phosphate (as $P_2O_5$) | 1.0 |

Overall recovery of hard particles of slow-release nitrogen was 97%. Similar results were obtained when bagasse, peanut hulls, wheat straw and waste paper were substituted for the dried orange pulp.

EXAMPLE 2

This example demonstrates supplementation of orange pulp into a nutritionally acceptable feed which is suitable for use as a major part of a cattle feeding ration and the use of a supplement liquid containing suspended solids. The orange pulp was essentially the same as that used in Example 1 except that it was undried and therefore contained about 65 percent moisture. A liquid feed supplement was used to furnish the acid catalyst for the reaction as well as urea and other nutrients. Prior to use the orange pulp was passed through a chopper where it was reduced to particles of workable size.

The liquid feed supplement used was made by mixing the following ingredients:

| Ingredients | Weight Percent In Mix |
| --- | --- |
| Solution A | 30.0 |
| Ammonium Sulfate, Crystals | 10.0 |
| Aqueous Urea Liquor (65% urea) | 40.0 |
| $CaCO_3$ (powdered limestone) | 5.0 |
| Water (total moisture 42.0%) | 15.0 |
| | 100.0 |

Since the supplement contained some suspended solids, the supplement was stirred during storage prior to use to prevent settling of the solids. The liquid feed supplement contained 106% protein equivalent and was composed as follows:

| Component | Weight Percent |
| --- | --- |
| Nitrogen | 17.1 |
| Protein Equivalent | 106.0 |
| Phosphorus | 4.6 |
| Sulfur | 2.5 |
| Calcium | 2.0 |

The chopped orange pulp and the liquid feed supplement were fed into a conventional blender at a rate of about 5 tons per hour of orange pulp and about 1,000 pounds per hour of liquid feed supplement with rates held as constant as possible during a two hour test period. The rate of supplement feed may be varied if required to maintain a protein equivalent of say 25–30 percent or more in the final product.

The moist impregnated orange pulp formed in the blender was fed to a conventional rotary, gas fired dryer. Combustion gases fed to the dryer were maintained at about 2,900°F. to permit efficient removal of water from the impregnated orange pulp. The dryer was suitably controlled to give a dried product temperature of about 180°F. and the resulting product contained about 8 percent water. Retention time in the dryer was about 18 minutes.

The dried impregnated orange pulp was fed at about 180°F. to a pellet mill, which was a conventional Sprout-Waldron pellet machine fitted with a ⅜-inch die. The amount of pelleted, supplemented feed collected in the product hopper was 8,400 pounds.

Recovery of protein equivalent through the process was 95%. The pellets, thus produced, were hard and not subject to dusting or fracture during normal handling. The surface was able to hold a soybean oil additive containing aureomycin and other medicinals applied at a 1% level without becoming sticky or difficult to handle. The 1% medicinal soybean oil application was made by spraying directly on the pellets.

The product pellets contained 55 percent of the total nitrogen in the form of water-insoluble, slow-release nitrogen and therefore could be fed to ruminants with a high degree of safety. Moreover, the pellets were palatable to ruminants when fed on a free choice basis.

EXAMPLE 3

This example demonstrates that it is not necessary to utilize substantially pure urea as a source of amide nitrogen in the present invention. For this test, a mixed amide source was prepared by partial pyrolysis of urea to form biuret in accordance with known procedures, followed by addition of water and attapulgite clay to the pyrolyzate. Composition of the resulting mixture, which for convenience will be called "liquid amide source", was as follows:

| Component | Weight Percent |
| --- | --- |
| Biuret | 19.1 |
| Urea | 43.4 |
| Clay | 2.0 |
| Water | 34.5 |
| Triuret | 0.2 |
| Cyanuric Acid | 0.8 |
| Total Nitrogen 27.85% (wt.) | |
| Protein Equivalent 174% (wt.) | |

Orange pulp used in this example was the same as that used in Example 2. Processing was somewhat similar to Example 2 but involved additional steps as described below, to increase the water-insoluble nitrogen content of the product.

When the moist orange pulp arrived at the conversion plant it was threaded into small pieces so that sufficient surface would be available for rapid reaction with the amides. The orange pulp was then continuously transmitted to the blender where the liquid amide source, superphosphoric acid and the pulp were blended to form a homogeneous mixture which was acidic (pH about 2). The plant was operated for eight hours with the following feed rates: orange pulp — 2,000 lbs./hr.; liquid amide source — 45 lbs./hr.; and superphosphoric acid — 4.5 lbs./hr. (containing ortho- and polyphosphoric acid). Analysis of the superphosphoric acid catalyst was as follows:

| Component | Weight Percent |
|---|---|
| $P_2O_5$ | 73.0 |
| Percent of total $P_2O_5$ as Polyphosphate | 71.7 |
| F | 0.13 |
| $Fe_2O_3$ | 1.15 |
| $Al_2O_3$ | 0.81 |
| MgO | 0.20 |
| $SO_4$ | 2.75 |

The blended reactants were fed by means of a screw feeder into the continuous direct gas fired rotary dryer (which is also a reactor) operating at essentially atmospheric pressure. The dryer-reactor was operated to allow entrance of reactants in one end and discharge from the other with back mixing minimized so that careful control was maintained over the amount of water removal. Enough moisture was maintained throughout the dryer to allow hydrolysis-degradation of the polysaccharides without charring the product. Discharge temperature of the solids was maintained at 190°F. and moisture content of the reacted material was maintained at 8%. The remaining moisture which had entered with the feed materials was continuously discharged with the combustion gases. Samples withdrawn from the dryer solids stream reduced Fehling's solution indicating presence of aldehydic groups.

The partially reacted and free-flowing intermediate product was continuously discharged from the rotary dryer. This intermediate product had a dry appearance and low density with a high surface area. Onto this material was continuously sprayed cane molasses at 140°F. at a rate of seven pounds per hour. The molasses was concentrated, containing about 65% polysaccharides, about half of which were water-soluble disaccharides. Molasses readily reduced Fehling's solution indicating presence of carbonyl groups which undergo aldehydic condensations.

The mixture containing the partially reacted amides and polysaccharides was charged to the pellet mill where small portions of the mixture were nearly instantaneously compressed to 5,000 psig, and the temperature increased to 215°F. The product was immediately discharged from pressure zone of the mill to an insulated area operating at atmospheric pressure. In this area the reaction between the partially degraded saccharides and amides was allowed to continue adiabatically and the temperature increased to 250°F. in 15 minutes retention time. The agglomerated particles, about ⅜-inch in diameter and ½-inch long, were then cooled. The cooled agglomerate had a hard homogeneous surface and good particle strength.

Of the total nitrogen fed, about 98% was recovered as usable product. About 62% of the total nitrogen was present in water-insoluble form, as determined by A.O.A.C. procedures.

Agronomic tests showed that the product is an excellent slow-release fertilizer. The product supplies plant food over an extended period of time and released nitrogen much slower than urea or ammonium sulfate.

Theh product was also tested in conventional in-vitro artificial rumen test using rumen fluid freshly withdrawn from a rumen-fistulated Jersey steer. In these tests, the product have a relatively constant supply of ammonia nitrogen in amount which could be efficiently used by the animal. Tests were also carried out to demonstrate that the instant product is non-toxic to ruminants. Four sheep ranging from 100 to 105 pounds in weight were starved for 24 hours, then force fed 1 kilogram each of the product. The animals were observed for 7 days and no sign of urea toxicity was noted in the animals.

EXAMPLE 4

This example demonstrates supplementation of orange pulp into a nutritionally acceptable ruminant feed which is suitable for use as a major part of a cattle feeding ration. The orange pulp used was substantially the same as that used in Example 1 except that an equal weight of water was added to the dry pulp to form a moist pulp.

The liquid feed supplement used was made by mixing the following ingredients:

| Ingredients | Weight Percent |
|---|---|
| Solution A (dry basis) | 13.0 |
| Ammonium Sulfate | 4.9 |
| Urea | 31.0 |
| Sodium Chloride | 10.1 |
| Trace Minerals | 1.0 |
| Water | 40.1 |
| | 100.0 |

About 76.8 parts by weight of the liquid feed supplement was mixed with 15.5 parts by weight of molasses and the resulting mixture was blended with 500 parts by weight of the moist orange pulp.

Then, the impregnated orange pulp was reacted and dried in a conventional rotary, gas fired dryer. Retention time in the dryer was 20 minutes, and the dryer was controlled to give a dried product temperature of 257°F. The resulting reaction product contained about 6 percent water.

A portion of the reaction product was ground in a Waring Blender until all of the sample passed through a 12-mesh Tyler screen. This product was suitable for use as a "meal product."

A portion of the product was finely ground in a hammer mill then pelleted at a pressure of about 3,000 p.s.i.g. in a rotary extrusion-type pellet mill at 217°F. to produce pellets ⅛ inch in diameter and about ⅜ inch in length. The pellets contained 5.08 percent nitrogen (31.75% protein equivalent) and about 6% water;

Recovery of protein equivalent through the process was greater than 90%. The pellets produced were hard and not subject to dusting or fracture during normal handling.

An attrition test was developed to evaluate the integrity of the pellets in handling. In accordance with this attrition test, 100 grams of pellets are placed on a 12-mesh Tyler screen and the screen is shaken vigorously for 5 minutes. The material passing through the screen as fines is weighed; recovery of little or not fines indicates satisfactory integrity of the pellets. In the present example, the pellet integrity was considered very satisfactory, i.e., only 3.3 percent of the 100 grams of pellets passed through the screen as fines in the attrition test. In a comparative test in which orange pulp containing only 7% moisture was substituted for the moist orange pulp used in this example, the pellet integrity was relatively poor, i.e., 23.5 percent of the 100 grams of pellets passed through the screen as fines in the attrition test. In additional experiments, it was determined that the solid carbohydrate material used in the process should preferably contain about 25 to 75 weight percent water to produce pellets having satisfactory integrity. Said water may be present in the solid carbohydrate material initially or it may be added as required.

EXAMPLE 5

A series of pelleted, slow-release nitrogen compositions were prepared to show the effect of reaction pH on the recovery of non-protein nitrogen through the process. The procedure of Example 4 was followed except that the pH of the liquid feed supplement was varied over a wide pH range by addition of phosphoric acid or sodium hydroxide. It is important that the pH of the liquid feed supplement does not correspond closely to the pH of the overall reaction mixture. Accordingly, the pH of the reaction mixture was also determined. The solid carbohydrate substrates appear to exert a strong buffering effect. Thus, it was necessary to use very low pH values in the liquid feed supplement to obtain significant reductions in the pH of the total reaction mixture. The following Table I shows the effect of pH of the liquid feed supplement on the pH of the total reaction mixture and on the recovery of non-protein nitrogen fed into the process.

TABLE I

| pH of Liquid Feed Supplement | pH of Reaction Mixture | % Non-Protein Nitrogen Recovered |
| --- | --- | --- |
| 0.0 | 2.7 | 92.5 |
| 2.2 | 5.4 | 92.5 |
| 4.0 | 6.3 | 91.5 |
| 4.8 | 6.7 | 90.0 |
| 8.2 | 8.0 | 68.0 |

These data indicate that the pH of the liquid feed supplement should be no greater than about 4.8, preferably about 2-4, in order to recover at least 90% of the non-protein nitrogen fed to the process. A pH lower than 2 may be used, if desired, but this is not preferred because of cost factors and handling problems. It is also apparent that the pH of the reaction mixture should be no greater than 6.7, preferably no greater than 6.3. optimum nitrogen recoveries are obtained when the pH of the reaction mixture is no greater than 5.4.

Discussion

An especially preferred embodiment of the present invention may be summarized as follows. A process of preparing a nontoxic pelleted ruminant feed, which comprises:

a. providing an aqueous ruminant feed supplement comprising 4 to 8 parts by weight of water soluble sulfate, up to 20 parts by weight of molasses, 20 to 35 parts by weight of urea, and 10 to 25 parts by weight, on a dry basis, of an acid selected from the group consisting of superphosphoric acid and aqueous ammoniated superphosphoric acid having a nitrogen content of about 9 to 12 percent by weight, a total phosphorus content measured as $P_2O_5$ of 28 to 39% by weight, and wherein polymeric phosphates represent about 30 to 70 percent by weight based on the total phosphorus content, sufficient acid being present to provide a pH no greater than about 4.8, preferably about 2-4;

b. mixing said feed supplement with a solid waste or by-product carbohydrate material consisting essentially of water-soluble and water-insoluble polysaccharides and containing 25 to 75 weight percent of water, to impregnate the solid waste or by-product carbohydrate material and provide about 2 to 10 weight percent total nitrogen on a dry basis and provide an acid catalyst for hydrolysis of the polysaccharides to form aldehydic carbonyl groups reactive to urea, said mixture having a pH no greater than 6.7, preferably no greater than 6.3;

c. drying and reacting the mixture from step (b) in a conventional gas fired dryer at a temperature within the range 160° to 290°F. for 5 to 60 minutes to obtain a dried, reacted, slow-release nitrogen product containing 5 to 12 percent by weight of water; and d. pelleting and agglomerating said dried product at a pressure of 500–20,000 p.s.i.g. while maintaining the temperature thereof at about 140°F. to 300°F.; and e. cooling the resulting pelleted product to ambient temperature to form hard pellets wherein 50 to 90 percent of the total nitrogen is water-soluble nitrogen.

I claim:

1. A process of preparing a nontoxic pelleted ruminant feed, which comprises:

a. providing an aqueous ruminant feed supplement comprising 4 to 8 parts by weight of water soluble sulfate, up to 20 parts by weight of molasses, 20 to 35 parts by weight of urea, and 10 to 25 parts by weight, on a dry basis, of an acid selected from the group consisting of superphosphoric acid and aqueous ammoniated superphosphoric acid having a nitrogen content of about 9 to 12 percent by weight, a total phosphorus content measured as $P_2O_5$ of 28 to 39% by weight, and wherein polymeric phosphates represent about 30 to 70 percent by weight based on the total phosphorus content, sufficient acid being present to provide a pH no greater than about 4.8;

b. mixing said feed supplement with a solid waste or by-product carbohydrate material consisting essentially of water-soluble and water-insoluble polysaccharides and less than 1 percent by weight of nitrogen and containing 25 to 75 weight percent of water to impregnate the solid waste or by-product carbohydrate material and provide about 2 to 10 weight percent total nitrogen on a dry basis and provide an acid catalyst for hydrolysis of the polysaccharides to form aldehydic carbonyl groups reactive to urea, said mixture having pH no greater than 6.7;

c. drying and reacting the mixture from step (b) in a conventional gas fired dryer at a temperature within the range 160° to 290°F. for 5 to 60 minutes to obtain a dried, reacted, slow-release nitrogen product containing 5 to 12 percent by weight of water;

d. grinding said dried product sufficiently to pass through a 12-mesh Tyler screen;

e. then pelleting and agglomerating said dried product at a pressure of 500–20,000 p.s.i.g. while maintaining the temperature thereof at about 140°F. to 300°F.; and f. cooling the resulting pelleted product to ambient temperature to form hard pellets wherein 50 to 90 percent of the total nitrogen is water-insoluble nitrogen.

2. The process of claim 1 wherein the pH of the liquid ruminant feed supplement in step (a) is 2–4.

3. The process of claim 1 wherein the pH of the mixture in step (b) is no greater than 6.3.

4. The process of claim 1 wherein about 0.5 to 7 percent, based on the total weight of polysaccharides, of a water-soluble polysaccharide is incorporated into the dried impregnated material from step (c) prior to pelleting in step (e) to facilitate agglomerating the product.

5. The process of claim 1 wherein the pelleted product from step (e) is maintained at 140° to 300°F. for 1 to 60 minutes prior to cooling in step (f), whereby the water-insoluble, slow-release nitrogen content of the composition is increased.

6. The process of claim 1 wherein the drying and reacting temperature in step (c) is maintained within the range 180° to 240°F., based on the temperature of the solid material.

7. The process of claim 1 wherein the pellet formation temperature in step (e) is 200° to 300°F.

8. The process of claim 1 wherein a minor proportion of sewage sludge is incorporated into the formulation immediately prior to pelleting in step (e).

* * * * *

UNITED STATES PATENT AND TRADEMARK OFFICE
CERTIFICATE OF CORRECTION

PATENT NO. : 3,878,304
DATED : April 15, 1975
INVENTOR(S) : William P. Moore

It is certified that error appears in the above-identified patent and that said Letters Patent are hereby corrected as shown below:

Column 2, line 35, after "2-10", insert --percent with a water-insoluble nitrogen content--.

Column 5, line 8, before "such" insert --material--.

Column 9, line 8, "threaded" should read --shredded--.

Column 10, line 14, "Theh" should read --The--.

Column 10, line 17, "have" should read --gave--.

Signed and Sealed this third Day of February 1976

[SEAL]

Attest:

RUTH C. MASON
Attesting Officer

C. MARSHALL DANN
Commissioner of Patents and Trademarks